United States Patent
Vampola et al.

(10) Patent No.: US 8,258,451 B2
(45) Date of Patent: Sep. 4, 2012

(54) IMAGE CAPTURE SYSTEM INCLUDING MULTIPURPOSE PHOTODETECTOR

(75) Inventors: John L. Vampola, Santa Barbara, CA (US); Alan W. Hoffman, Goleta, CA (US)

(73) Assignee: Raytheon Company, Waltham, MA (US)

( * ) Notice: Subject to any disclaimer, the term of this patent is extended or adjusted under 35 U.S.C. 154(b) by 635 days.

(21) Appl. No.: 12/415,631

(22) Filed: Mar. 31, 2009

(65) Prior Publication Data

US 2010/0176275 A1  Jul. 15, 2010

Related U.S. Application Data

(60) Provisional application No. 61/145,052, filed on Jan. 15, 2009.

(51) Int. Cl.
  *H03F 3/08* (2006.01)
(52) U.S. Cl. .......... 250/214 A; 250/214 DC; 250/208.1; 348/294; 348/306; 257/431
(58) Field of Classification Search ............... 250/208.1, 250/214.1, 214 DC, 214 R, 214 A; 348/294, 348/297, 306, 308, 312; 257/431, 445, 446
  See application file for complete search history.

(56) References Cited

U.S. PATENT DOCUMENTS

| 5,354,980 A | 10/1994 | Rappoport et al. ........ 250/208.1 |
| 5,625,210 A | 4/1997 | Lee et al. |
| 5,631,704 A | 5/1997 | Dickinson et al. |
| 5,841,126 A | 11/1998 | Fossum et al. |
| 5,841,159 A | 11/1998 | Lee et al. |
| 5,952,686 A | 9/1999 | Chou et al. |
| 6,410,899 B1 | 6/2002 | Merrill et al. |
| 7,492,399 B1 | 2/2009 | Gulbransen et al. .......... 348/294 |
| 2009/0091648 A1* | 4/2009 | Lin et al. ........................ 348/301 |

FOREIGN PATENT DOCUMENTS

| WO | WO 2005/015639 A1 | 2/2005 |
| WO | WO 2006/073875 A2 | 7/2006 |

OTHER PUBLICATIONS

Article "Active pixel sensor" from Wikipedia, http://en.wikipedia.org/wiki/Active_pixel_sensor pp. 1-6.
*PCT Notification of Transmittal of the International Search Report and the Written Opinion of the International Searching Authority* for International Application No. PCT/US2010/020290; 13 pages, Mar. 17, 2010.

* cited by examiner

*Primary Examiner* — Francis M Legasse, Jr.
(74) *Attorney, Agent, or Firm* — Lando & Anastasi, LLP

(57) ABSTRACT

In certain embodiments, a system is provided for image capture that includes a unit cell that includes a Capacitor TransImpedance Amplifier (CTIA) subcircuit, a Source Follower per Detector (SFD) subcircuit, and a Direct Injection (DI) subcircuit. The unit cell may operate using one of the subcircuits selected in response to a control signal. A column amplifier may be coupled to the unit cell. The column amplifier may be operable to receive an intermediate signal from the unit cell and couple components of the column amplifier corresponding to the selected subcircuit in response to the control signal. The column amplifier may generate an output signal from the intermediate signal using the coupled components of the column amplifier.

14 Claims, 12 Drawing Sheets

IMAGE CAPTURE SYSTEM INCLUDING MULTIPURPOSE PHOTODETECTOR

RELATED APPLICATION

This application claims benefit under 35 U.S.C. §119(e) of U.S. Provisional Application Ser. No. 61/145,052, titled "Multipurpose Photodetector Amplifier and Control Methods," Attorney's Docket 075896.0105, filed Jan. 15, 2009, by John L. Vampola et al.

TECHNICAL FIELD OF THE INVENTION

The present invention relates generally to image processing, and more particularly to a multipurpose photodetector amplifier and control methods.

BACKGROUND OF THE INVENTION

In general, image capture devices are optimized for one of three modes of operation, low ambient light scene, bright ambient light scene, or high amplification. Image sensors used in image capture devices generally generate charge in proportion to light intensity received at that location. Low ambient light scenes requires components with low noise and low capacitance in order to provide high sensitivity. However, a bright ambient light scene requires higher capacitance in order to store the generated charge. Devices that provide a high degree of amplification also have differing requirements. These competing requirements lead to image capture devices being optimized for one of these three modes of operation.

SUMMARY OF THE INVENTION

In accordance with the present invention, the disadvantages and problems associated with prior image detection devices have been substantially reduced or eliminated.

In certain embodiments, a system is provided for image capture that includes a unit cell that includes a Capacitor TransImpedance Amplifier (CTIA) subcircuit, a Source Follower per Detector (SFD) subcircuit, and a Direct Injection (DI) subcircuit. The unit cell may operate using one of the subcircuits selected in response to a control signal. A column amplifier may be coupled to the unit cell. The column amplifier may be operable to receive an intermediate signal from the unit cell and couple components of the column amplifier corresponding to the selected subcircuit in response to the control signal. The column amplifier may generate an output signal from the intermediate signal using the coupled components of the column amplifier.

In certain embodiments, a method for image capture that includes receiving a control signal at circuitry controlling a unit cell. The method then determines a mode of operation of the unit cell based on the control signal. The mode of operation may include one of a CTIA, SFD, or DI mode of operation. Voltages may be applied to components of the unit cell based on the mode of operation determined by the control signal. Particular circuit components of a column amplifier may be coupled to the unit cell in response to the control signal. An output signal may be generated from an intermediate signal using the coupled components of the column amplifier.

The following technical advantages may be achieved by some, none, or all of the embodiments of the present invention. Technical advantages of certain embodiments of the present invention include providing a designer of an image capture device the ability to use a single image sensor in a wide variety of applications. For example, utilizing the described embodiment of unit cell above, permits an image sensor to perform CTIA, SFD, and DI capture, read, and reset operations utilizing the same components. The total dynamic range of unit cell may be greater than 110 dB. Further, the operation of image capture device can be programmed to change with changing scene conditions or multiple readouts in different operational modes may be performed without affecting the accumulated charge at the unit cell, thus preserving the captured light intensity data.

DETAILED DESCRIPTION OF THE INVENTION

Figure 1:
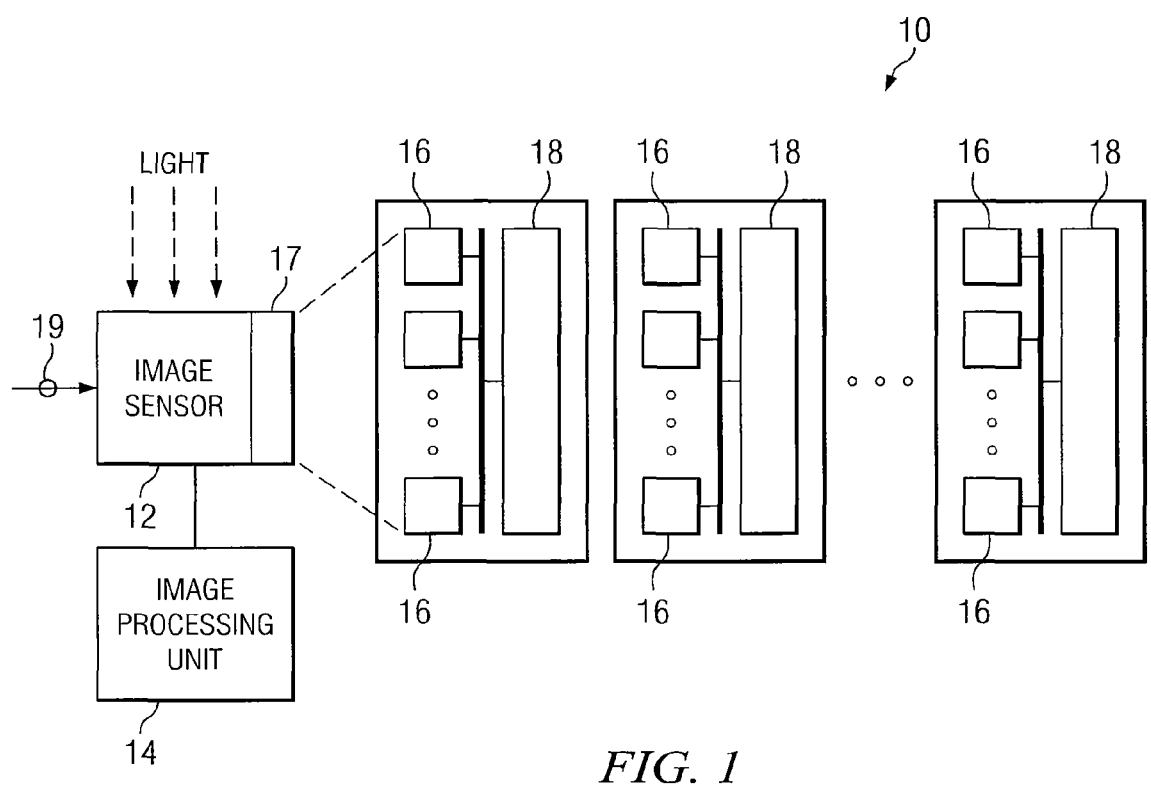
FIG. 1 is a block diagram illustrating one embodiment of an image capture device.

There are many types of image capturing devices such as digital cameras, video cameras, or other photographic and/or image capturing equipment. These image capturing devices may use image sensors, such as active pixel sensors (APS) or other suitable light sensing devices in order to capture the image. For example, an APS may be composed of a unit cell array that receives light from a lens. The light causes each unit cell to accumulate an electric charge proportional to the light intensity at that location.

Each unit cell in the array may be circuitry that may include a capacitor and other components. Each unit cell in the array generally corresponds to a picture element, or pixel, in the final image. A pixel is considered the smallest portion of a digital image. A digital image is generally made up of an array of pixels. Circuitry coupled to the image capturing device may perform post light capture processing steps to convert the accumulated charge into pixel information. This information may include the color, saturation, brightness, or other information that a digital image storage format may require. Digital images may be stored in formats such as .JPG, .GIF, .TIFF, or any other suitable format.

A unit cell is generally optimized for one of three modes of operation, Capacitor TransImpedance Amplifier (CTIA), Source Follower per Detector (SFD), and Direct Injection (DI). Each mode of operation is used for a different application. For example, the CTIA mode is an active feedback amplifier to hold the detector at a constant voltage to create a high gain amplifier. SFD mode is used in low light or radiance situations such as in astronomical image capture. DI mode is used for bright light or high radiance situations.

In general, each mode of operation has certain operational requirements that appear to be mutually exclusive. For example, an image capture device may be optimized for high sensitivity (SFD mode) or low sensitivity (DI mode). This generally corresponds to a low ambient light situation or a bright ambient light situation, respectively. In a low ambient light situation, such as shadows, pictures taken at night, indoors, or other situations where there is a relatively low amount of ambient light, an image capture device generally requires a higher sensitivity in order to be able to differentiate levels of the accumulated electric charge to generate a meaningful image after processing. For example, in a high sensitivity device, an additional 5 units of charge could result in a different level of brightness in the final image, whereas in a low sensitivity device, an additional 50 units of charge would result in a different level of brightness in the final image.

In high sensitivity devices, parasitic capacitance, the unwanted and generally unavoidable capacitance that exists between parts of a circuit should be minimized. Because small changes in the units of charge may correspond to different levels in the final image, accumulated charge that is used to charge these "capacitors" may lead to larger errors in the final image. The result is that the amount of the accumulated charge may not proportionally reflect the light intensity at the location or result in an image that is higher in noise.

A bright ambient light situation, such as a sunny day, a well-lit room, or other situations where there is a relatively large amount of ambient light, presents a different problem. In a bright ambient light situation, a much larger amount of charge accumulates due to the greater intensity of the light captured by the image capture device. The larger amount of charge generally requires the addition of a capacitor to store the accumulated charge generated at the APS array. There is usually a much greater amount of charge accumulated compared to the charge lost to the parasitic capacitance of the components, such that the effect of the parasitic capacitance may generally be ignored. Thus, an image capture device that is optimized for a bright ambient light situation would not perform optimally in a low ambient light situation due to the difference in accumulated charge and capacitance requirements for the two situations.

These competing requirements lead to the design of unit cells that are optimized for a single mode of operation that are unique and applicant dependant. Thus, the utility of any single design may be limited. However, through manipulation of transistors within the unit cell by use of additional circuitry outside the until cell, a unit cell may be converted to perform any of the three modes of operation, CTIA, SFD, and DI.

FIG. 1 is a block diagram illustrating an image capture device 10 that may be used to capture images. For example device 10 may be a digital camera, video camera, or other photographic and/or image capturing equipment. Image capture device 10 comprises image sensor 12 and image processing unit 14. Image sensor 12 may be an APS or other suitable light sensing device that can capture images. Image processing unit 14 may be a combination of hardware, software, or firmware that is operable to receive signal information from image sensor 12 and convert the signal information into an electronic image.

Image sensor 12 may comprise an array of unit cells 16. Unit cells 16 may accumulate charge proportional to the light intensity at that location. Each unit cell 16 may correspond to a pixel in the captured electronic image. Unit cell 16 may temporarily store the accumulated charge for use by processing unit 14 to create an image. The stored charge, for example, may be converted into a voltage and the value of the voltage may be sampled by processing unit 14 in order to digitize and store the value into some form of memory.

Each column of the array of unit cells may be coupled to column amplifier 18. Column amplifier 18 may provide additional processing of the accumulated charge prior to processing by image processing unit 14. In certain embodiments, column amplifier may be part of image processing unit 14. In certain embodiments, external circuitry 17 may also be operable to control components of unit cell 16 and/or column amplifier 18. External circuitry 17 may receive a control signal 19 which designates a mode of operation for unit cell 18. External circuitry 17 may then apply voltages to components of unit cell 16 and/or column amplifier 18 or to couple switches in unit cell 16 and/or column amplifier 18 to have unit cell 16 and/or column amplifier 18 perform the mode of operation designated in control signal 19.

Figure 2:
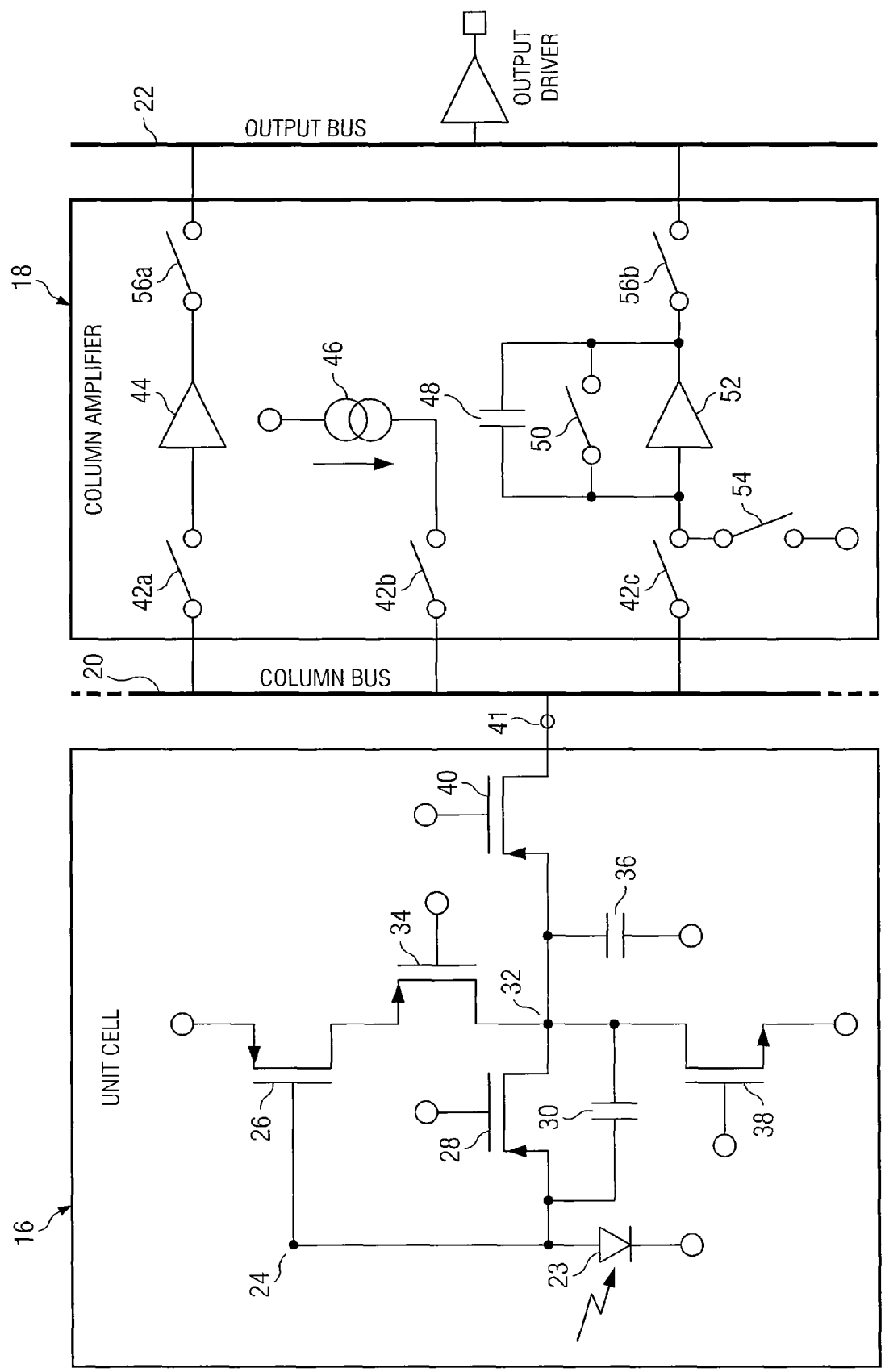
FIG. 2 illustrates one embodiment of a unit cell of an image sensor of the image capture device.

FIG. 2 illustrates a unit cell 16 that may be part of the array of unit cells 16 that comprise image sensor 12 and image processing unit 14. Unit cell 16 may be coupled to a column amplifier 18 which in turn is coupled to image processing unit 14. Alternatively, column amplifier 18 may be formed as part of image processing unit 14. A column bus 20 may couple each unit cell 16 in a column of the unit cell array in image sensor 12 to column amplifier 18. An output bus 22 may couple column amplifier 18 to image processing unit 14. Column amplifier 18 may provide common functionality for processing of the charge stored in each unit cell 16. For example, each unit cell 16 within a column of the array of unit cells 16 in image sensor 12 may be processed row by row. Each unit cell 16 may use the functionality of column amplifier 18 prior to final processing by image processing unit 14. Thus, by providing column amplifier 18, the functionality of column amplifier 18 may be shared across all unit cells 16 in a column as opposed to having each unit cell 16 designed separately with the functionality provided by column amplifier 18. This may lead to power savings in the image sensor 12 and its corresponding unit cells.

Unit cell 16 may comprise a circuit with a first node 24 coupled to a photodetector 23 as part of image sensor 12. Unit cell 16 is illustrated with FET type transistors, but any suitable transistor type is contemplated. The first node 24 may also be coupled to a first transistor 26 and second transistor 28 and a feedback capacitor 30. The first transistor 26, second transistor 28, and a feedback capacitor 30 may be coupled in parallel to each other and joined at a second node 32. An optional cascode transistor 34 may be inserted in series with the first transistor 26 which causes the cascode transistor 34 to be coupled to the second node 32. Also coupled to the second node 32 may be a integration capacitor 36, a reset transistor 38, and an enable transistor 40. Enable transistor 40 may be coupled to column amplifier 18 via column bus 20. An intermediate signal 41 may be propagated from unit cell 16 to column amplifier 18.

Column amplifier 18 may be coupled to column bus 20 via column bus switches 42. Column bus switches 42 may serve to couple the components of column amplifier 18 to column bus 20. The components of column amplifier 18 operate in conjunction with the components of unit cell 16 to provide various modes of operation. Components of column amplifier 18 may be configured to provide modes of operation corresponding to the CTIA, SFD, and DI modes of operation of unit cell 16. For CTIA processing, CTIA/SFD amplifier 44 may be used. For SFD processing, CTIA/SFD amplifier 44 and a current source 46 may be used. For DI processing, a DI capacitor 48, DI switch 50, and a DI amplifier 52 (collectively referred to as DI processing components) may be coupled in parallel to each other. Additionally, a DI reset switch 54 may be coupled to switch 42c and the DI processing components. Output bus switches 56 couple column amplifier 18 to output bus 22. Output bus switch 56a may be coupled to CTIA/SFD amplifier 44 and output bus switch 56b may be coupled to the DI processing components.

Figure 3:
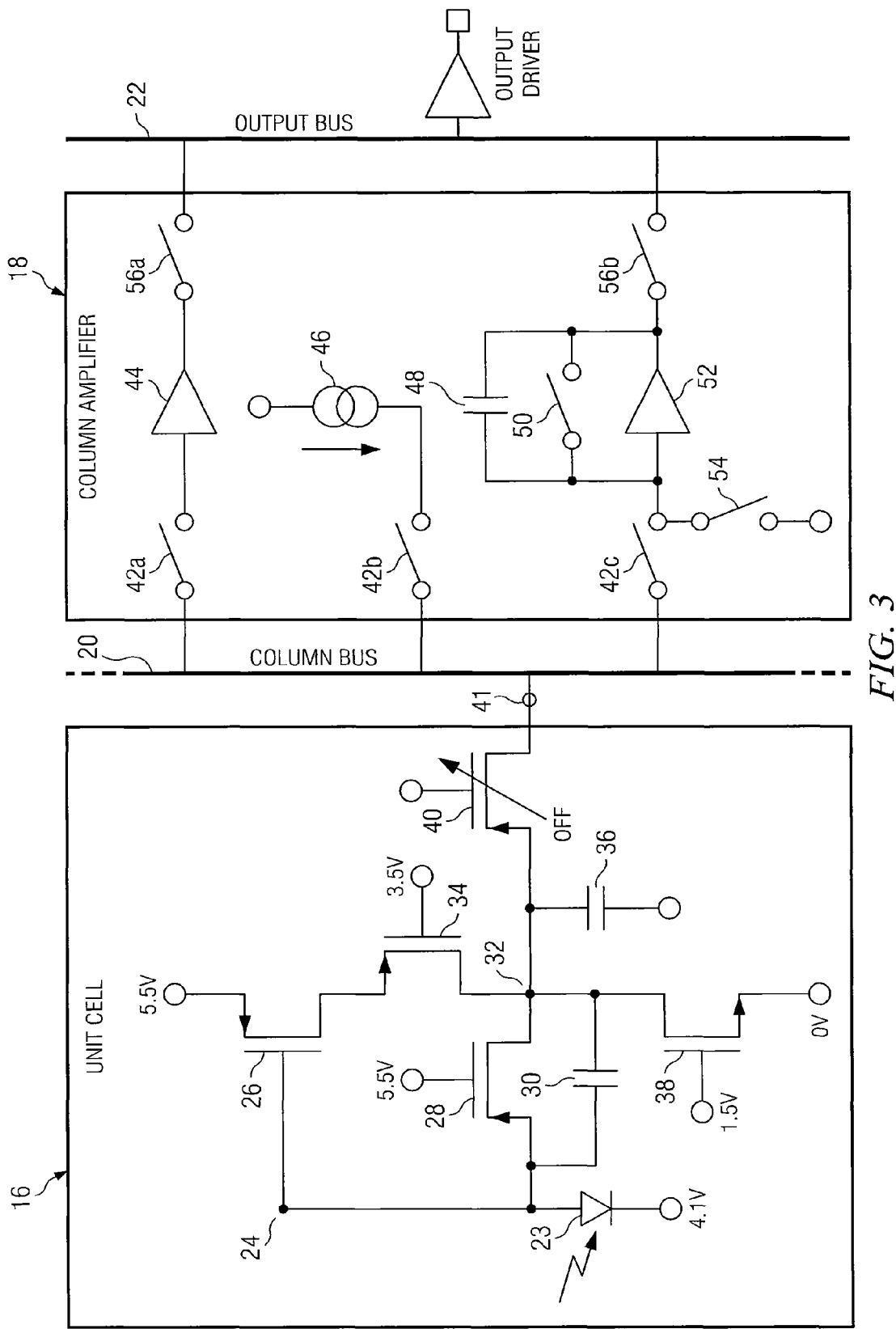
FIGS. 3-5 illustrate configurations of an embodiment of a unit cell and column amplifier in Capacitor TransImpedance Amplifier (CTIA) capture, read, and reset operations.
Figure 4:
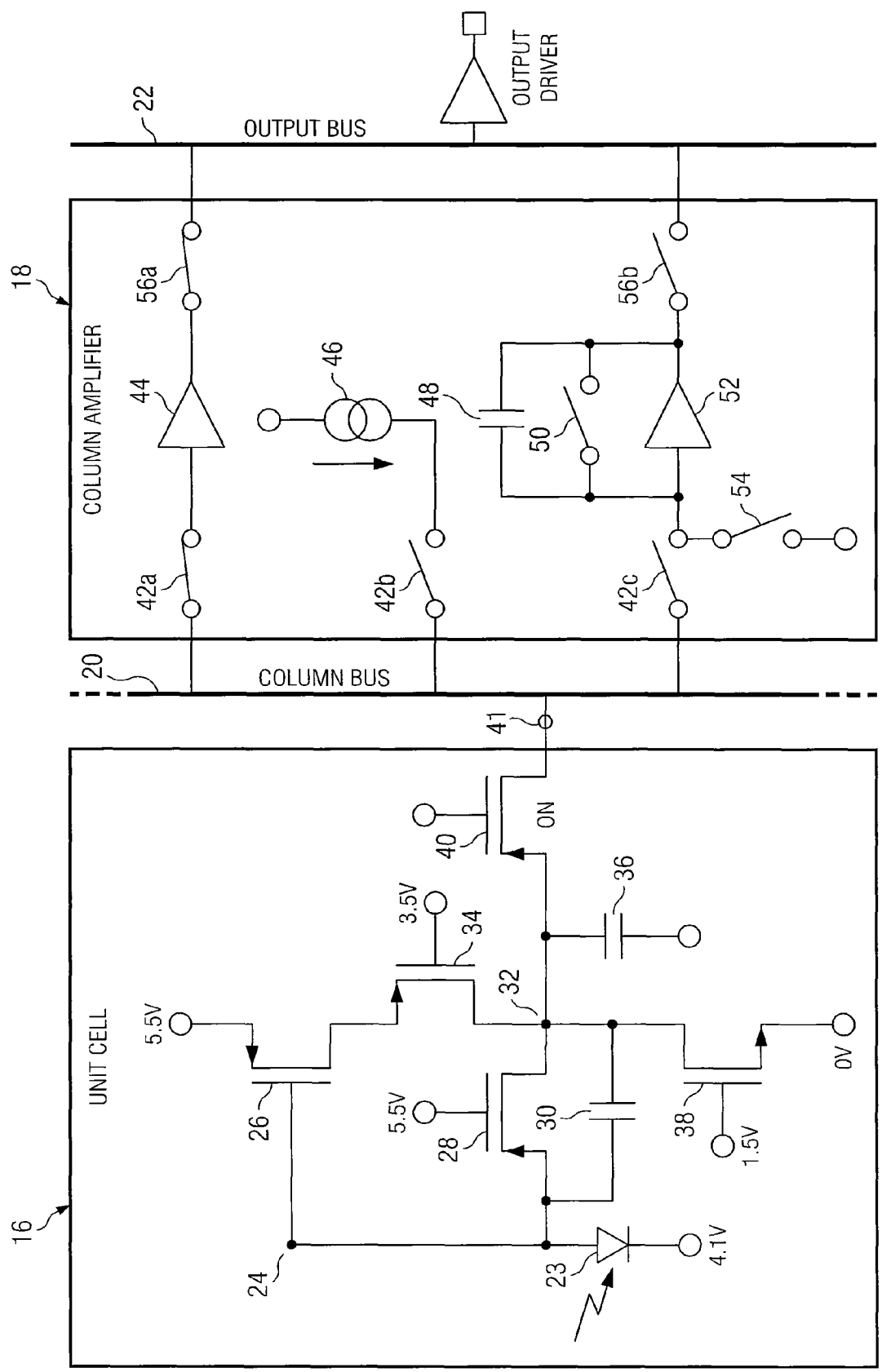
Figure 5:
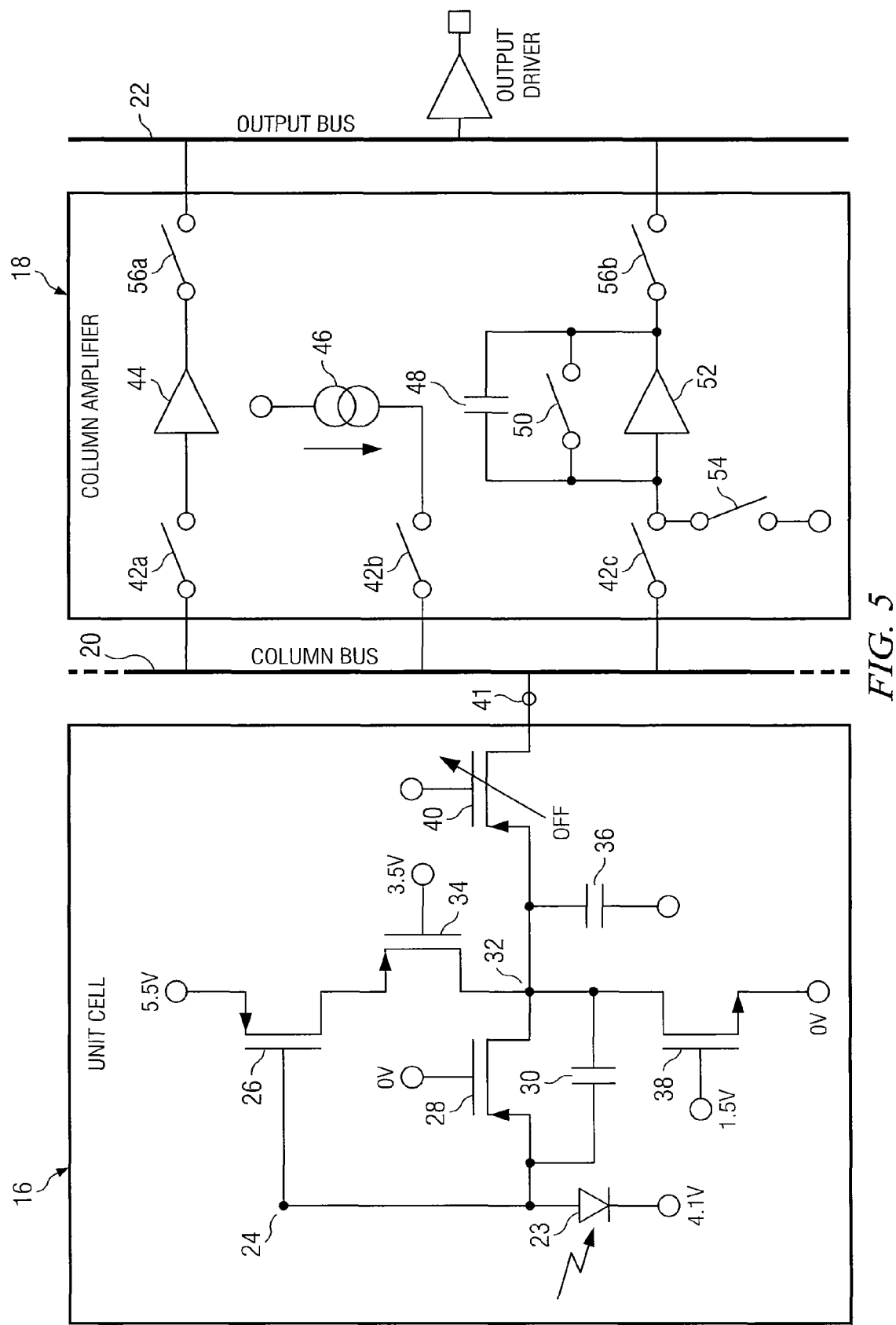
Figure 6:
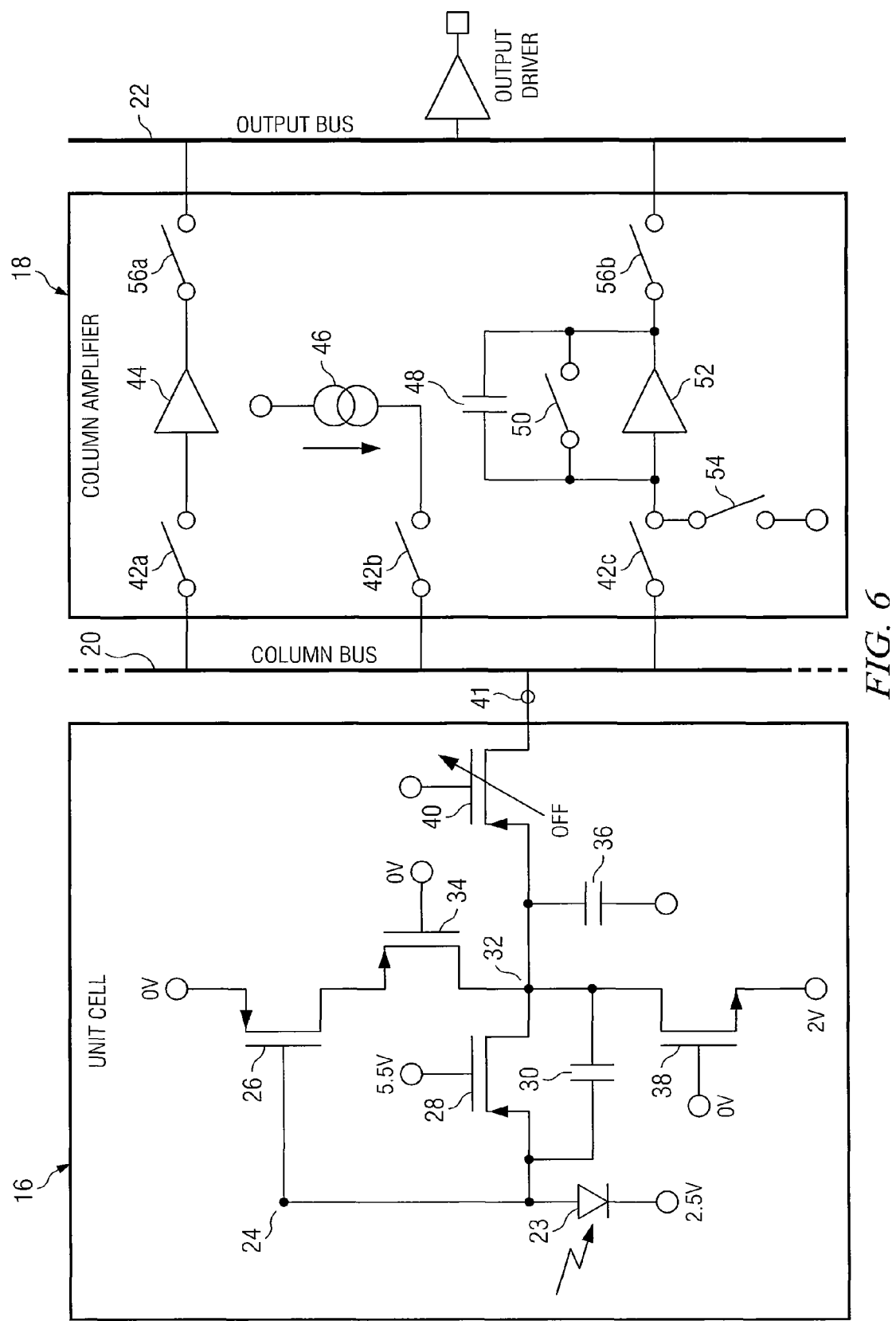
FIGS. 6-8 illustrate configurations of an embodiment of a unit cell in Source Follower per Detector (SFD) capture, read, and reset operations.
Figure 7:
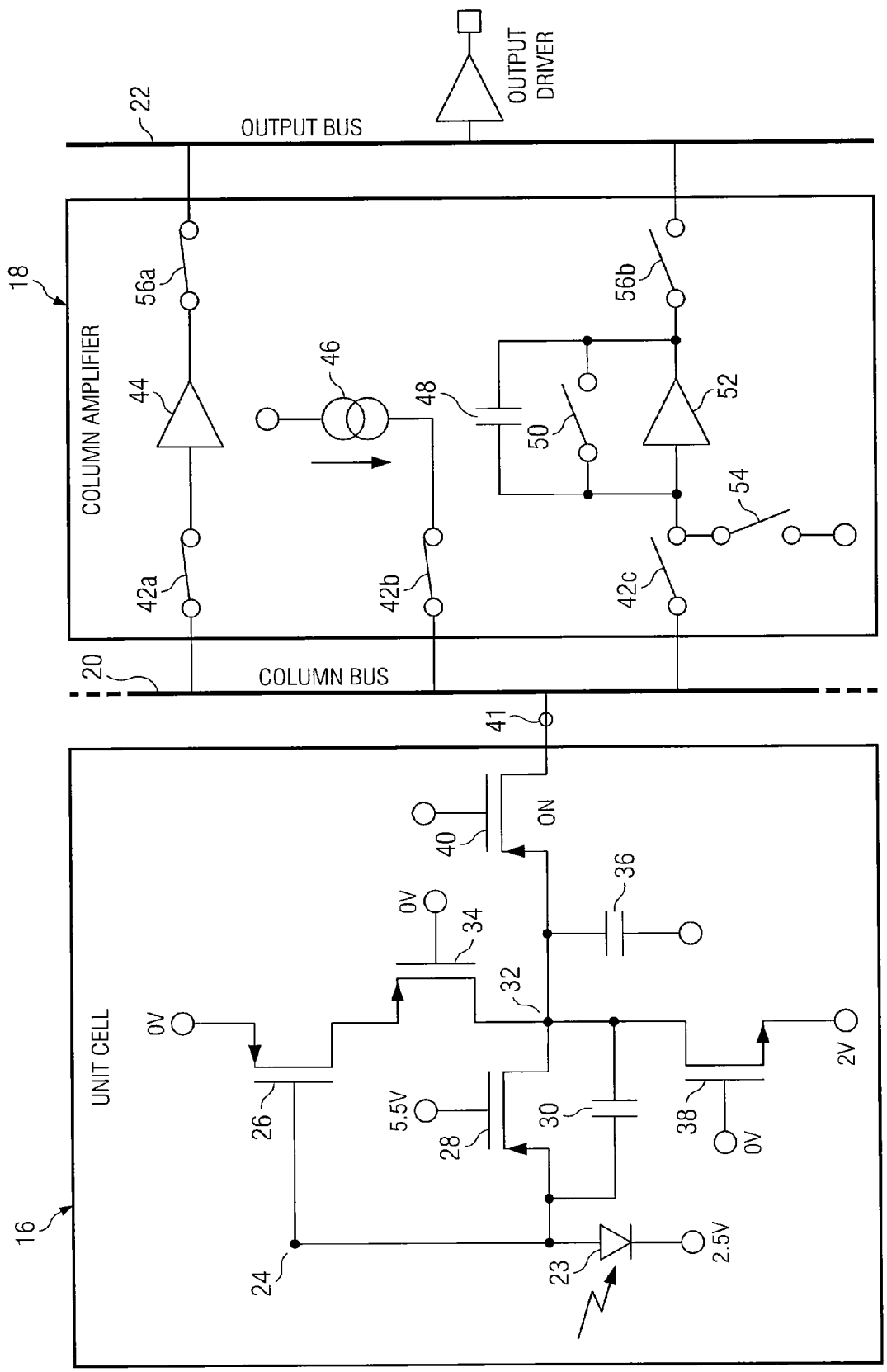
Figure 8:
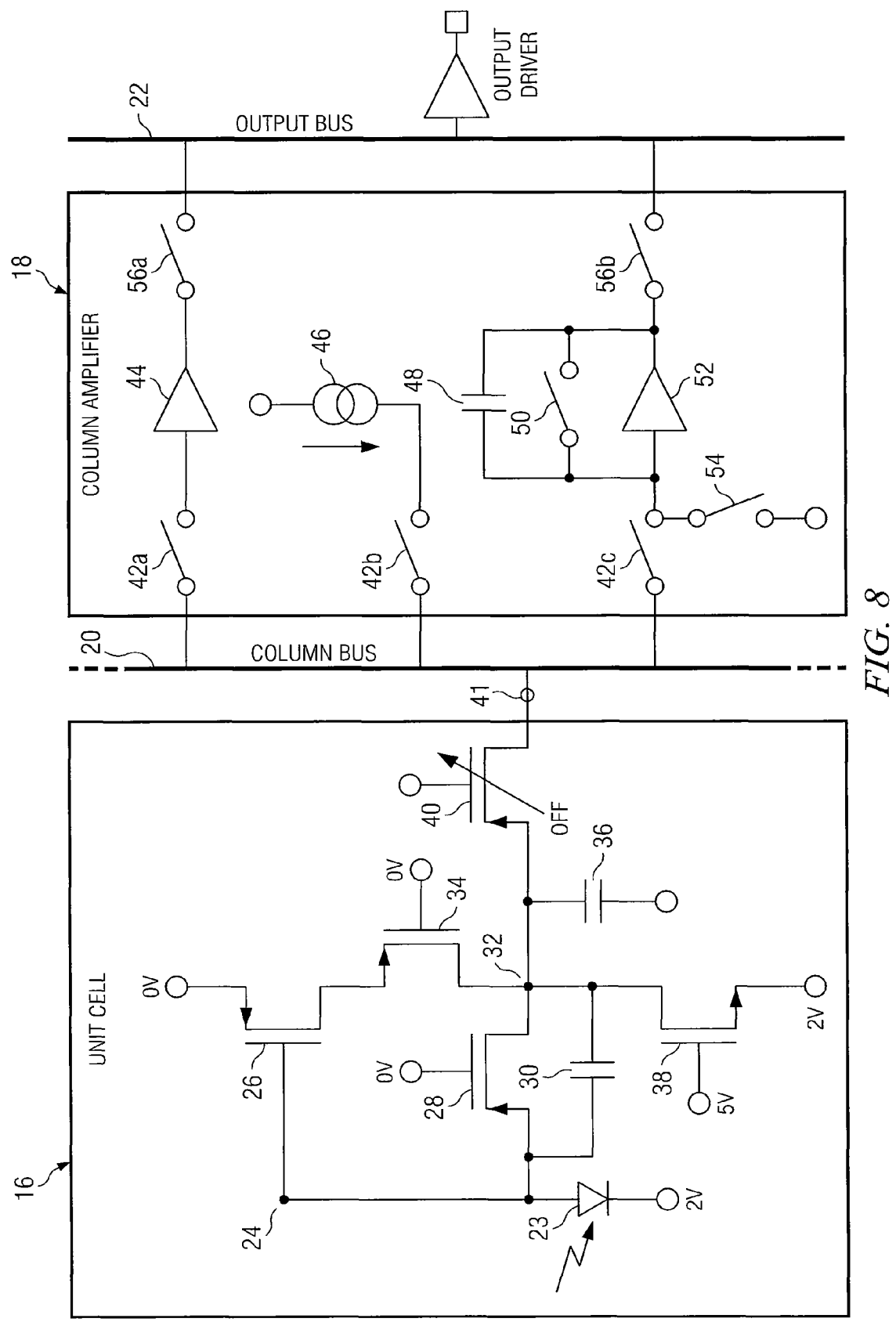
Figure 9:
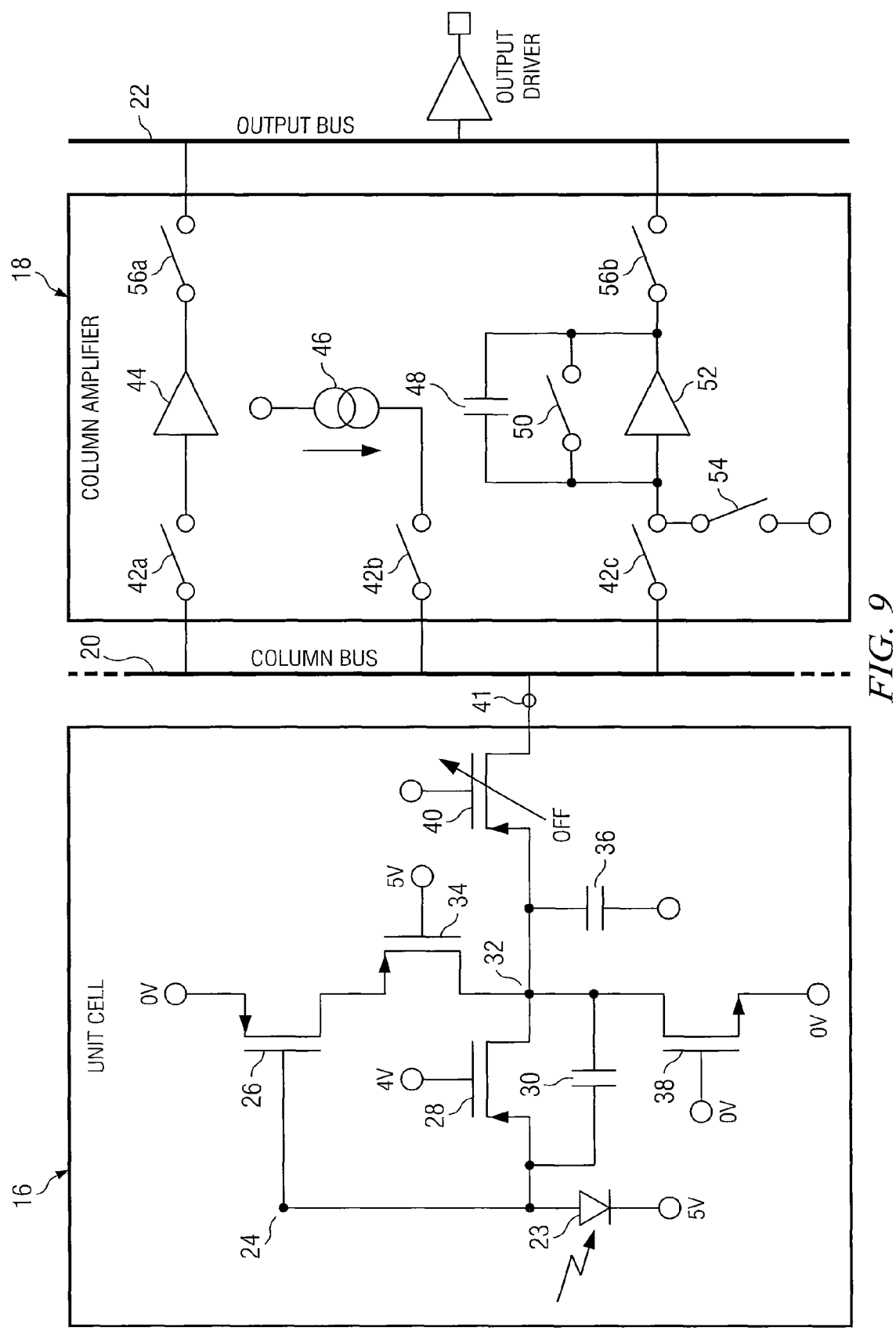
FIGS. 9-11 illustrate configurations of an embodiment of a unit cell in Direct Injection (DI) capture, read, and reset operations.
Figure 10:
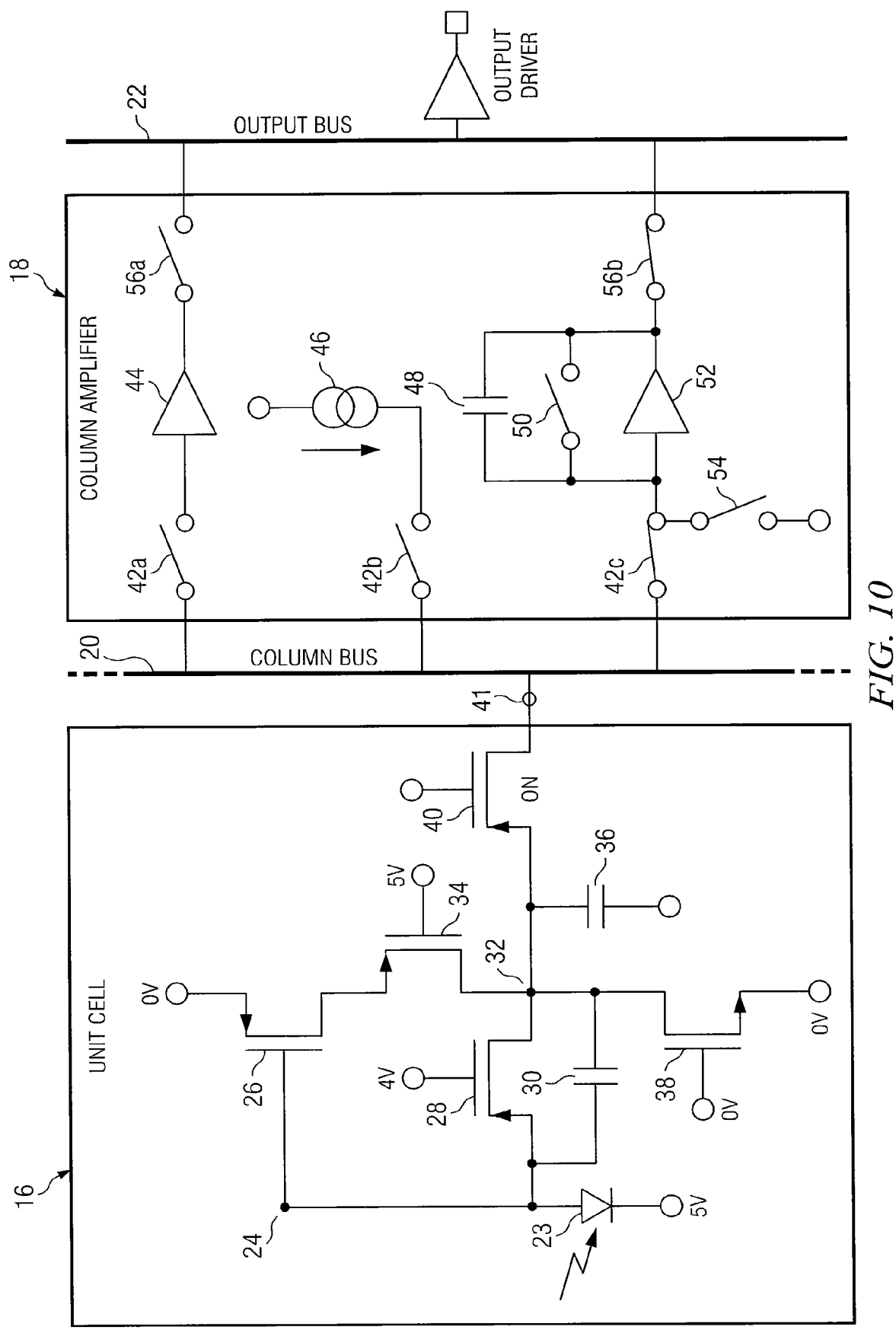
Figure 11:
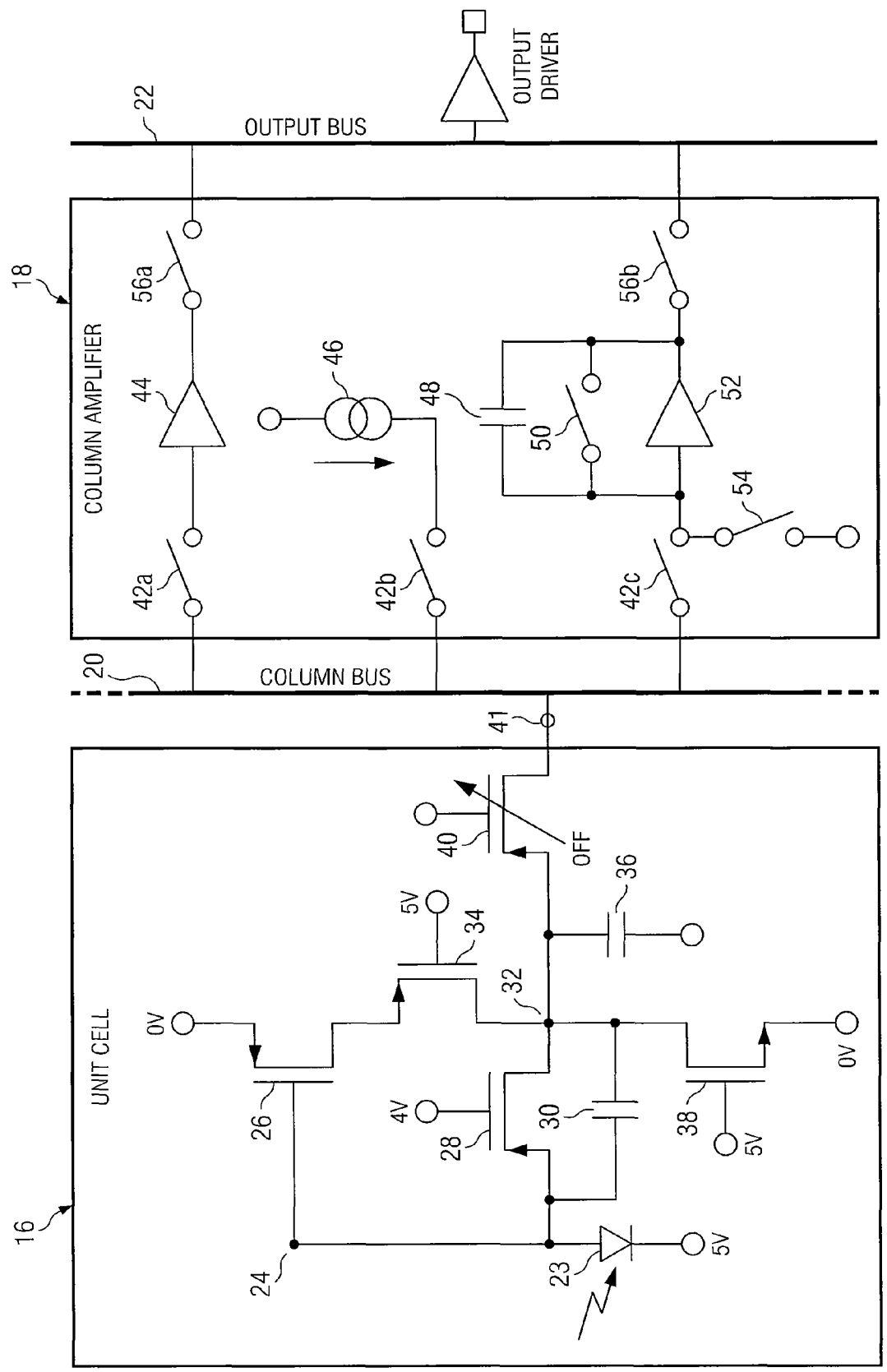

FIGS. 3-5 illustrate configurations of an embodiment of unit cell 16 and column amplifier 18 in CTIA capture, read, and reset operations. FIGS. 6-8 illustrate configurations of an embodiment of unit cell 16 and column amplifier 18 in SFD capture, read, and reset operations. FIGS. 9-11 illustrate configurations of an embodiment of unit cell 16 and column amplifier 18 in DI capture, read, and reset operations.

FIG. 3 illustrates an embodiment of a configuration of unit cell 16 and column amplifier 18 in a CTIA capture operation. As described earlier, unit cell 16 operates like a high gain amplifier in CTIA mode. In a CTIA capture operation, charge accumulates at first node 24 and feedback capacitor 30. Various voltages that may be determined by a control signal 19 input to circuitry outside unit cell 16 may be applied to the first transistor 26 and second transistor 28. In CTIA operation, a voltage is applied to the source of the first transistor 26 high enough to maintain the cascode transistor 34 in saturation as well as to maintain the desired voltage at the node common to transistors 26 and 34. A voltage is applied to the gate of the second transistor 28 to turn it on. If the optional cascode transistor 34 is present, a voltage is also applied to the gate of the cascode transistor 34 in order to keep it turned it on. A voltage is applied to the gate of enable transistor 40 to disable it during the capture operation. Thus, during capture, charge is accumulated at unit cell 16 and an intermediate signal 41 representing the accumulated charge is not yet sent to column amplifier 18. A voltage is applied to the gate of the reset transistor 38 such that the reset transistor 38 may act as a source of current. The source of the reset transistor 38 may be grounded.

FIG. 4 illustrates an embodiment of a configuration of unit cell 16 and column amplifier 18 in a CTIA read operation. In this embodiment of a CTIA read operation, the voltages described with respect to the CTIA capture operation in FIG. 3 remain the same with one exception. The voltage applied to the gate of enable transistor 40 is different. The voltage applied to enable transistor 40 is changed in a read operation to turn enable transistor 40 on. This allows an intermediate signal 41 to propagate from unit cell 16 to column bus 20. Column bus switches 42 may be configured as follows. Column bus switch 42a may be in the closed position and column bus switches 42b and 42c may be in the open position. This allows the intermediate signal 41 to propagate through CTIA/SFD amplifier 44. Output bus switch 56a may be in the closed position to allow the intermediate signal 41 to propagate through the output bus 22 to image processor 14. Output bus switch 56b may be in the open position to prevent the intermediate signal 41 from being affected by the DI processing components.

FIG. 5 illustrates an embodiment of a configuration of unit cell 16 and column amplifier 18 in a CTIA reset operation. After a readout, unit cell 16 may be reset. This allows a new image to be captured and processed by image capture device 10. In reset, the accumulated charge is allowed to drain from unit cell 16. In a CTIA reset operation, the enable transistor 40 may have a gate voltage applied to it to turn it off. A reset path for capacitor 20 may be provided through the second transistor 28. This would allow accumulated charge to be drained from unit cell 16.

In capture, read, and reset operations of unit cell 16 in CTIA mode, certain voltages may be applied to the components of unit cell 16 and column amplifier 18 via circuitry external to unit cell 16 and column amplifier 18. The voltages may be controlled by a control signal 19. The external circuitry 17 receives a control signal 19 designating a CTIA capture operation. In one embodiment the circuitry causes 5.5V to be applied to the source of the first transistor 26, 5.5V to be applied to the gate of the second transistor 28, 3.5V at the gate of the cascode transistor 34, a voltage of 1.5V at the gate of the reset transistor 38, 0V at the source of reset transistor 28 and a voltage to turn enable transistor 40 off. Based on the application of voltages to the components of unit cell 16, a charge proportional to the intensity of light at unit cell 16 is accumulated.

In a read operation, the external circuitry 17 receives a control signal 19 designating a CTIA read operation. In one embodiment a voltage is applied to the gate of enable transistor 40 to turn enable transistor 40 on. The external circuitry 17 may also cause column bus switch 42a to close, and column bus switches 42b and 42c to open. Additionally the external circuitry 17 may cause output bus switch 56a to close and output bus switch 56b to open. This provides a path from unit cell 16 to output bus 22 through CTIA/SFD amplifier allowing a signal to be read from unit cell 16. This signal may be propagated to image processing unit 14 in order to create an image.

After a read operation, unit cell 16 may be reset. A control signal 19 may designate a CTIA reset operation. In one embodiment, this may cause a voltage to be applied to enable transistor 40 to cause it to turn off. The voltage applied at the gate of second transistor 28 may be the ground voltage to permit charge to be drained from unit cell 16. After reset, another capture operation may be initiated.

FIGS. 6-8 illustrate an embodiment of configurations of an embodiment of unit cell 16 in SFD capture, read, and reset operations. FIG. 6 illustrates a configuration of unit cell 16 and column amplifier 18 in a SFD capture operation. As described above, SFD mode is a mode for low light or low radiance situations such as in astronomical image capture. The external circuitry 17 may receive a control signal 19 designating a SFD capture operation. Various voltages that may be determined by a control signal 19 input to circuitry outside unit cell 16 may be applied to the first transistor 26 and second transistor 28. In SFD capture configuration, a voltage is applied to the source of the first transistor 26 to activate it. A voltage is applied to the gate of the optional cascode transistor 34 to turn the cascode transistor on. A voltage is applied to the gates of the second transistor 28 and reset transistor 38 to turn them off. A voltage is applied to the gate of enable transistor 40 to disable it during the capture operation. Thus, during capture, charge is accumulated at unit cell 16 and an intermediate signal 41 representing the accumulated charge is not yet sent to column amplifier 18. A voltage is applied to the gate of the reset transistor 38 such that the reset transistor 38 is in the off position. The source of the reset transistor 38 may be grounded.

FIG. 7 illustrates an embodiment of a configuration of unit cell 16 and column amplifier 18 in a SFD read operation. In a SFD read operation, the voltages described with respect to the SFD capture operation in FIG. 6 remain the same with one exception. The voltage applied to the gate of enable transistor 40 is different. The voltage applied to enable transistor 40 is changed in a read operation to turn enable transistor 40 on. This allows an intermediate signal 41 to propagate from unit cell 16 to column bus 20. Column bus switches 42 may be configured as follows. Column bus switches 42a and 42b may be in the closed position and column bus switch 42c may be in the open position. This allows the current source 46 to be coupled to column bus 20. The combined intermediate signal 41 and current from current source 46 propagates through CTIA/SFD amplifier 44. Output bus switch 56a may be in the closed position to allow the intermediate signal 41 to propagate through the output bus 22 to image processor 14. Output bus switch 56*b* may be in the open position to prevent the intermediate signal 41 from being affected by the DI processing components.

FIG. 8 illustrates an embodiment of a configuration of unit cell 16 and column amplifier 18 in a SFD reset operation. After a readout, unit cell 16 may be reset. This allows a new image to be captured and processed by image capture device 10. In reset, the accumulated charge is allowed to drain from unit cell 16. In a SFD reset operation, the enable transistor 40 may have a gate voltage applied to it to turn it off. A path to ground may be provided through the reset transistor 38. A voltage may be applied to the gate of the second transistor 28 to turn it on. Similarly, a voltage may be applied to the gate of reset transistor 38 to turn it on. This would allow accumulated charge to be drained from unit cell 16.

In capture, read, and reset operations of unit cell 16 in SFD mode, certain voltages may be applied to the components of unit cell 16 and column amplifier 18 via circuitry external to unit cell 16 and column amplifier 18. The voltages may be controlled by a control signal 19. The external circuitry 17 receives a control signal 19 designating a SFD capture operation. In one embodiment, the circuitry causes a ground voltage to be applied to the gate of cascode transistor 34 and gate of reset transistor 38, 0V to be applied to source of the first transistor 26 and 5.5V at the gate of the second transistor 28, 2V at the source of reset transistor 28 and a voltage to turn enable transistor 40 off. Charge is accumulated at unit cell 16.

In a read operation, the external circuitry 17 receives a control signal 19 designating a SFD read operation. In one embodiment, a voltage is applied to the gate of enable transistor 40 to turn enable transistor 40 on. The external circuitry 17 may also cause column bus switches 42*a* and 42*b* to close, and column bus switch 42*c* to open. Additionally the external circuitry 17 may cause output bus switch 56*a* to close and 56*b* to open. This provides a path from unit cell 16 to output bus 22 through CTIA/SFD amplifier 44 allowing a signal to be read from unit cell 16. This signal may be propagated to image processing unit 14 in order to create a part of an image.

After a read operation, unit cell 16 may be reset. A control signal 19 may designate a SFD reset operation. In one embodiment, this may cause a voltage to be applied to enable transistor 40 to cause it to turn off. The voltage applied at the gate of second transistor 28 may be the ground voltage. Additionally, 5V may be applied to the gate of reset transistor 38 and 2V at the source of reset transistor 38 to permit charge to be drained from unit cell 16. After reset, another capture operation may be initiated.

FIGS. 9-11 illustrate an embodiment of configurations of an embodiment of unit cell 16 in DI capture, read, and reset operations. FIG. 9 illustrates a configuration of unit cell 16 and column amplifier 18 in a DI capture operation. As described earlier, DI operation may be used in bright light or high radiance applications. In a DI capture operation, charge accumulates at first node 24, second node 32, and integration capacitor 36. Various voltages that may be determined by a control signal 19 input to circuitry outside unit cell 16 may be applied to the first transistor 26 and second transistor 28. A voltage is applied to the source of the first transistor 26 to cause the first transistor to be off. A voltage may be applied to the optional cascode transistor 34 to also shut the cascode transistor 34 off. A voltage is applied to the gate of the second transistor 28 to turn it on. A voltage is applied to the gate of enable transistor 40 to disable it during the capture operation. Thus, during capture, charge is accumulated at unit cell 16 and an intermediate signal 41 representing the accumulated charge is not yet sent to column amplifier 18. A voltage is applied to the gate of the reset transistor 38 such that the reset transistor 38 is in the off position. The source of the reset transistor 38 may be grounded.

FIG. 10 illustrates an embodiment of a configuration of unit cell 16 and column amplifier 18 in a DI read operation. In a DI read operation, the voltages described with respect to the DI capture operation in FIG. 9 remain the same with one exception. The voltage applied to the gate of enable transistor 40 is different. The voltage applied to enable transistor 40 is changed in a read operation to turn enable transistor 40 on. This allows an intermediate signal 41 to propagate from unit cell 16 to column bus 20. Column bus switches 42 may be configured as follows. Column bus switches 42*a* and 42*b* may be in the open position and column bus switch 42*c* may be in the open position. DI switch 50 may also be in the open position. This allows the intermediate signal 41 to propagate through DI amplifier 52. Output bus switch 56*b* may be in the closed position to allow the intermediate signal 41 to propagate through the output bus 22 to image processor 14. Output bus switch 56*a* may be in the open position to prevent the intermediate signal 41 from being affected by the CTIA/SFD amplifier 44.

FIG. 11 illustrates an embodiment of a configuration of unit cell 16 and column amplifier 18 in a DI reset operation. After a readout, unit cell 16 may be reset. This allows a new image to be captured and processed by image capture device 10. In reset, the accumulated charge is allowed to drain from unit cell 16. In a DI reset operation, the enable transistor 40 may have a gate voltage applied to it to turn it off. A path to ground may be provided through the reset transistor 38. This would allow accumulated charge to be drained from unit cell 16.

In capture, read, and reset operations of unit cell 16 in DI mode, certain voltages may be applied to the components of unit cell 16 and column amplifier 18 via circuitry external to unit cell 16 and column amplifier 18. The voltages may be controlled by a control signal 19. In one embodiment, the external circuitry 17 receives a control signal 19 designating a DI capture operation. In one embodiment, the circuitry causes a ground voltage to be applied to the source of the first transistor 26, and gate and source of reset transistor 38, 5V at the gate of optional cascode transistor 34, 4V to be applied to the gate of the second transistor 28, and a voltage to turn enable transistor 40 off. Charge is accumulated at unit cell 16.

In a read operation, the external circuitry 17 receives a control signal 19 designating a DI read operation. In one embodiment, a voltage is applied to the gate of enable transistor 40 to turn enable transistor 40 on. The external circuitry 17 may also cause column bus switches 42*a* and 42*b* to open, and column bus switch 42*c* to close. Additionally the external circuitry 17 may cause output bus switch 56*a* to open and 56*b* to close. DI switch 50 may also be in the open position. This provides a path from unit cell 16 to output bus 22 through DI amplifier 52 allowing a signal to be read from unit cell 16. This signal may be propagated to image processing unit 14 in order to create a part of an image.

After a read operation, unit cell 16 may be reset. A control signal 19 may designate a DI reset operation. In one embodiment, this may cause a voltage to be applied to enable transistor 40 to cause it to turn off. The voltage applied at the gate of second transistor 28 may remain at 4V. Additionally, 5V may be applied to the gate of reset transistor 38 and a ground voltage at the source of reset transistor 38 to permit charge to be drained from unit cell 16. After reset, another capture operation may be initiated.

Although the CTIA, SFD, and DI modes of operation have been described with a reset of unit cell 16 after a read operation, additional read operations in other modes of operation may be performed prior to a reset of unit cell 16. For example, a CTIA read operation may have been performed. A control signal 19 may be sent to circuitry controlling unit cell 16 to perform a SFD read operation. Unit cell 16 may then be configured with respect to the SFD read operation and a second read operation may be performed using the accumulated electrons at unit cell 16. This may provide the ability for image capture device 10 to generate a more desirable image from the accumulated electrons using a more optimal mode than originally chosen.

Figure 12:
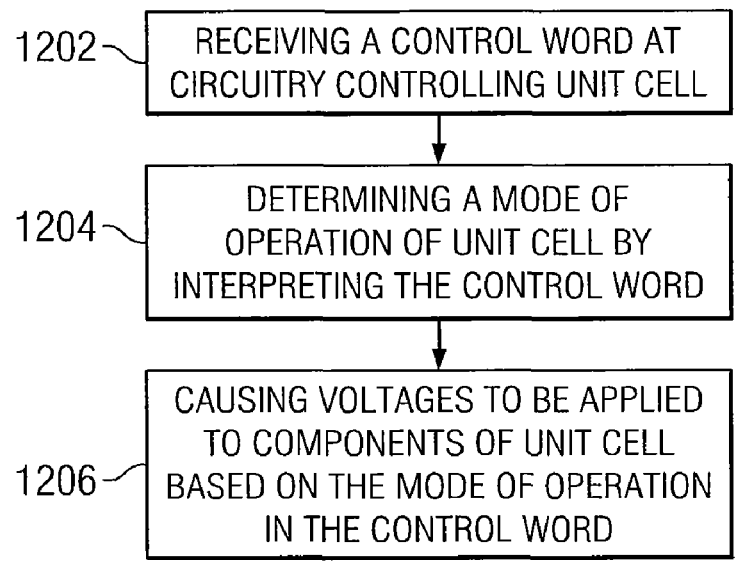
FIG. 12 illustrates a method for utilizing control signals to control a unit cell.

FIG. 12 illustrates a method for utilizing control signals 19 to control unit cell 16. At step 1202, a control signal 19 is received at circuitry controlling unit cell 16. The control signal 19 may designate a mode of operation for unit cell 16. At step 1204, the control signal 19 is interpreted to determine a mode of operation for unit cell 16. The mode of operation may be one of the modes of operation described with respect to FIGS. 3-11 such as, CTIA, SFD and DI. At step 1206, the control circuitry may cause voltages to be applied to components of unit cell 16 based on the mode of operation in the control signal 19.

In this regard, the use of external circuitry 17 to apply voltages to components of unit cell 16 provides a designer of an image capture device the ability to use a single image sensor 12 in a wide variety of applications. For example, utilizing the described embodiment of unit cell 16 above, permits an image sensor 12 to perform CTIA, SFD, and DI capture, read, and reset operations utilizing the same components. The total dynamic range of unit cell 16 may be greater than 110 dB. Further, the operation of image capture device 10 can be programmed to change with changing scene conditions or multiple readouts in different operational modes may be performed without affecting the accumulated charge at unit cell 16, thus preserving the captured light intensity data.

Figure 13:
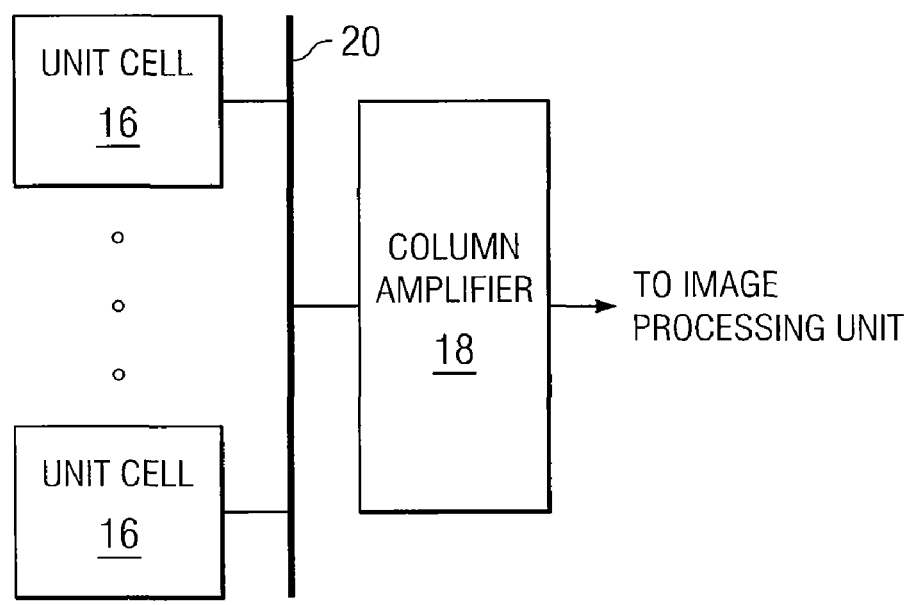
FIG. 13 is a block diagram illustrating a portion of an array of unit cells coupled to a column amplifier.

FIG. 13 is a block diagram illustrating a portion of an array of unit cells 16 coupled to a column amplifier 18. As described with respect to FIG. 1, image sensor 12 may comprise an array of unit cells 16. Each column of the array of unit cells 16 may be coupled to column bus 20. Column bus 20 may provide a shared path to column amplifier 18. Thus, each unit cell 16 in a column of the array of unit cells 16 in image sensor 12 may send an intermediate signal 41 to column amplifier 18 for additional processing prior to final processing by image processing unit 14.

The array of unit cells 16 in conjunction with column amplifier 18 may perform capture and readout operations of images in image capture device 10. During the capture operation, electric charge proportional to the light intensity at the array of unit cells 16 is accumulated. During the readout operation, the accumulated charge is converted into a signal for image processing unit 14 to process into a pixel. The array of unit cells 16 of image sensor 12 may perform various types of image capture and readout operations such as ripple capture/read, correlated double sampling, and adjustable integration time. Additionally, the array of unit cells 16 may also perform reset operations to reset unit cell 16 after a capture and/or read operation.

A particular method for image capture using image capture device 10 may be ripple capture/read. Ripple capture is a method that captures each row of pixels from image sensor 12 in order. For example, ripple capture may expose the top row of pixels of image sensor 12 to light, followed by the second row, followed by the third row, and so forth until the last row of pixels of image sensor 12 is exposed to light. A particular method for image processing unit 14 to receive pixel information captured by image sensor 12 may be ripple read. Ripple read is a method that processes each row of pixels from image sensor 12 in order. Similar to ripple capture, ripple read may process the top row of pixels of image sensor 12, followed by the second row, followed by the third row, and so forth until the last row of pixels of image sensor 12 is processed. A ripple reset operation to reset the rows of pixels of image sensor 12 may be performed similarly.

These methods may be performed on consecutive rows. For example, a ripple capture operation may begin with the first row of image sensor 12. As the ripple capture operation moves to the second row, a ripple read operation may begin on the first row of image sensor 12. After the ripple capture operation moves to the third row, the ripple read operation may begin on the second row and a ripple reset operation may begin on the first row. This may continue until the last row is processed. Once the last row is processed, the image may be processed and stored by processing unit 14.

Correlated double sampling is a method that may reduce noise in an image. In correlated double sampling, two read operations are performed. The first read operation may be performed prior to, or at initiation of a capture operation. For example, the amount of accumulated charge on unit cell 16 may be read after a reset operation. This may provide a baseline signal for image processing unit 14. A second read operation may be performed after the capture operation. This may provide the capture signal for image processing unit 14 to use to create the image. However, the capture signal may not reflect the actual pixel captured by image cell 16 due to the baseline signal being present prior to the capture operation. By performing certain operations, for example, subtraction of the baseline signal from the capture signal, the pixel generated by image processing unit 14 may be more reflective of the actual intensity of light captured by image sensor 12 at unit cell 16.

Adjustable integration time may also be desired for use in capture operations. Integration time may be considered the amount of time unit cell 16 is capturing charge. In adjustable integration time capture, image capture device 10 may be constantly capturing images. For example, image capture device 10 may continuously capture and read images using the ripple read/capture method described above. The period of time that image capture device 10 returns to the same unit cell between read operations may be greater than the amount of time desired to capture an image. External circuitry 17 may control the reset operation of unit cell 16 to extend the reset time of unit cell 16 in order to adjust the integration time. When unit cell 16 is resetting, no capture takes place. Thus, unit cell 16 would not be integrating during the reset time. This may allow unit cell 16 to have a desired integration time.

These types of capture and readout operations may be performed on the array of unit cells 16 in image sensor 12 in order to obtain image data from a unit cell 12 operating in CTIA, SFD, or DI modes. The components of unit cell 16 and column amplifier 18 may be controlled through external circuitry 17. This external circuitry 17 may be programmed through the use of control signals 19 or other appropriate means. The external circuitry 17 may turn on or off the various transistors and switches in unit cell 16 and column amplifier 18 in order to perform the various types of capture, read, and reset operations. For example, image capture device 10 could be set to capture an astronomical image in SFD mode. The external circuitry 17 could receive a control signal 19 to cause it to have the array of unit cells 16 in image detector 12 operate in SFD capture mode. Another control signal 19 could cause the external circuitry 17 to cause the array of unit cells 16 to send signals representing the captured charge to image processing unit 14 in a ripple read mode. Thus, the first row of unit cells 16 in the array of unit cells 16 could be read, followed by the second row, the third row, and so forth until each row of the array of unit cells 16 has been read.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for image capture, comprising: a unit cell comprising:
   a capacitor transimpedance amplifier (CTIA) subcircuit;
   a source follower per detector (SFD) subcircuit; and
   a direct injection (DI) subcircuit;
   wherein the unit cell operates using one of the CTIA subcircuit, the SFD subcircuit, or the DI subcircuit selected in response to a control signal; and
   a column amplifier coupled to the unit cell, the column amplifier operable to:
      receive an intermediate signal from the unit cell;
      couple components of the column amplifier corresponding to the selected subcircuit in response to the control signal; and
      generate an output signal from the intermediate signal using the coupled components of the column amplifier.

2. A system for image capture comprising:
   a unit cell comprising:
      a capacitor transimpedance amplifier (CTIA) subcircuit;
      a source follower per detector (SFD) subcircuit; and
      a direct injection (DI) subcircuit;
      wherein the unit cell operates using one of the CTIA subcircuit, the SFD subcircuit, or the DI subcircuit selected in response to a control signal; and
   a column amplifier coupled to the unit cell, the column amplifier operable to:
      receive an intermediate signal from the unit cell;
      couple components of the column amplifier corresponding to the selected subcircuit in response to the control signal; and
      generate an output signal from the intermediate signal using the coupled components of the column amplifier;
   wherein the column amplifier comprises:
      a first amplifier;
      a current source;
      a second amplifier;
      a first switch coupled to the input of the first amplifier;
      a second switch coupled to the output of the first amplifier;
      a third switch coupled to the current source;
      a fourth switch coupled to input of the second amplifier; and
      a fifth switch coupled to the output of the second amplifier; wherein the first, third, and fourth switches are coupled to the unit cell; and wherein the second and fifth switches are coupled to an output node.

3. A system for image capture comprising:
   a unit cell comprising:
      a capacitor transimpedance amplifier (CTIA) subcircuit;
      a source follower per detector (SFD) subcircuit; and
      a direct injection (DI) subcircuit;
      wherein the unit cell operates using one of the CTIA subcircuit, the SFD subcircuit, or the DI subcircuit selected in response to a control signal; and
   a column amplifier coupled to the unit cell, the column amplifier operable to:
      receive an intermediate signal from the unit cell;
      couple components of the column amplifier corresponding to the selected subcircuit in response to the control signal; and
      generate an output signal from the intermediate signal using the coupled components of the column amplifier;
   wherein the CTIA subcircuit comprises:
      a first transistor;
      a second transistor;
      a cascode transistor;
      a feedback capacitor;
      an enable transistor; and
      a reset transistor;
      wherein the first transistor and cascode transistors are coupled in series, and the second transistor, the feedback capacitor, the reset transistor, the cascode transistor, and the enable transistor are coupled to a common node.

4. The system of claim 3, wherein:
   the unit cell is operating in a CTIA capture mode;
   the first transistor is biased to maintain the cascode transistor in saturation;
   the second transistor is on; the enable transistor is off; and
   the reset transistor provides a current to the cascode and first transistor.

5. The system of claim 3, wherein:
   the unit cell is operating in a CTIA read mode;
   the first transistor is biased to maintain the cascode transistor in saturation;
   the second transistor is on;
   the enable transistor is on;
   the reset transistor provides a current to the cascode and first transistor; and
   an intermediate signal is communicated from the unit cell to the column amplifier.

6. The system of claim 3, wherein:
   the unit cell is operating in a CTIA reset mode;
   the first transistor is biased to maintain the cascode transistor in saturation;
   the second transistor is off;
   the enable transistor is off;
   the reset transistor provides a current to the cascode and first transistor; and
   charge is drained from the unit cell through the second transistor.

7. A system of for image capture comprising:
   a unit cell comprising:
      a capacitor transimpedance amplifier (CTIA) subcircuit;
      a source follower per detector (SFD) subcircuit; and
      a direct injection (DI) subcircuit;
      wherein the unit cell operates using one of the CTIA subcircuit, the SFD subcircuit, or the DI subcircuit selected in response to a control signal; and
   a column amplifier coupled to the unit cell, the column amplifier operable to:
      receive an intermediate signal from the unit cell;
      couple components of the column amplifier corresponding to the selected subcircuit in response to the control signal; and
      generate an output signal from the intermediate signal using the coupled components of the column amplifier;
   wherein the SFD subcircuit comprises:
      a first transistor;

a second transistor;
a cascode transistor;
an enable transistor; and
a reset transistor; wherein the first transistor is coupled to a second transistor, the first transistor and cascode transistors are coupled in series, and
wherein the reset transistor, the cascode transistor, the second transistor and the enable transistor are coupled to a common node.

8. The system of claim 7, wherein:
the unit cell is operating in a SFD capture mode;
the first transistor is on;
the second transistor is off the cascode transistor is on;
the enable transistor is off; and the reset transistor is off.

9. The system of claim 7, wherein:
the unit cell is operating in a SFD read mode;
the first transistor is on; the second transistor is off the cascode transistor is on;
the enable transistor is on;
the reset transistor is off; and
an intermediate signal is communicated from the unit cell to the column amplifier.

10. The system of claim 7, wherein:
the unit cell is operating in a SFD reset mode;
the first transistor is on;
the cascode transistor is on;
the second transistor is on;
the enable transistor is off;
the reset transistor is on; and
charge is drained from the unit cell through the second transistor and the reset transistor.

11. A system of for image capture comprising:
a unit cell comprising:
  a capacitor transimpedance amplifier (CTIA) subcircuit;
  a source follower per detector (SFD) subcircuit; and
  a direct injection (DI) subcircuit;
  wherein the unit cell operates using one of the CTIA subcircuit, the SFD subcircuit, or the DI subcircuit selected in response to a control signal; and
a column amplifier coupled to the unit cell, the column amplifier operable to:
  receive an intermediate signal from the unit cell;
  couple components of the column amplifier corresponding to the selected subcircuit in response to the control signal; and
  generate an output signal from the intermediate signal using the coupled components of the column amplifier;
wherein the DI subcircuit comprises:
  a transistor; an integration capacitor;
  an enable transistor; and
  a reset transistor;
  wherein the transistor, the integration capacitor, the enable transistor, and the reset transistor are coupled to a common node.

12. The system of claim 11, wherein:
the unit cell is operating in a DI capture mode; the transistor is on;
the reset transistor is off;
the enable transistor is off; and
charge is accumulated at the integration capacitor.

13. The system of claim 11, wherein:
the unit cell is operating in a DI read mode;
the transistor is on; the reset transistor is off;
the enable transistor is off; and
an intermediate signal is communicated from the unit cell to the column amplifier.

14. The system of claim 11, wherein:
the unit cell is operating in a DI reset mode;
the transistor is on; the reset transistor is on;
the enable transistor is off; and charge is drained from the unit cell through the reset transistor.

\* \* \* \* \*

UNITED STATES PATENT AND TRADEMARK OFFICE
CERTIFICATE OF CORRECTION

| | |
|---|---|
| PATENT NO. | : 8,258,451 B2 |
| APPLICATION NO. | : 12/415631 |
| DATED | : September 4, 2012 |
| INVENTOR(S) | : Vampola et al. |

Page 1 of 1

It is certified that error appears in the above-identified patent and that said Letters Patent is hereby corrected as shown below:

In Claim 7, column 12, line 49, "of" should be omitted.

In Claim 11, column 13, line 33, "of" should be omitted.

Signed and Sealed this
Sixth Day of November, 2012

David J. Kappos
*Director of the United States Patent and Trademark Office*